J. Young, of C.,
Boring Wood.
Nº 13,243.  Patented July 10, 1855.
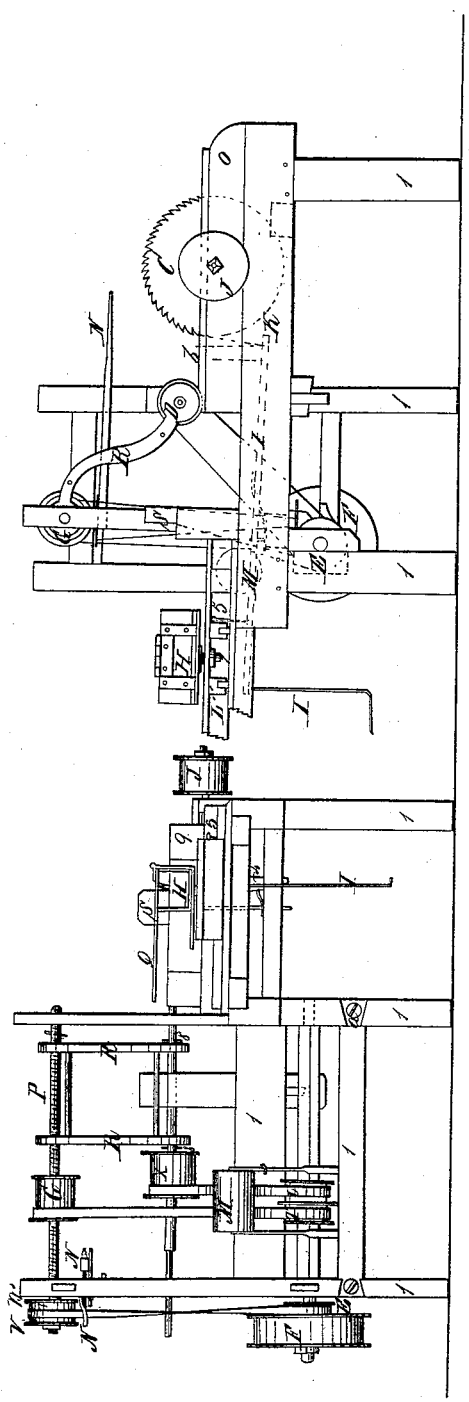
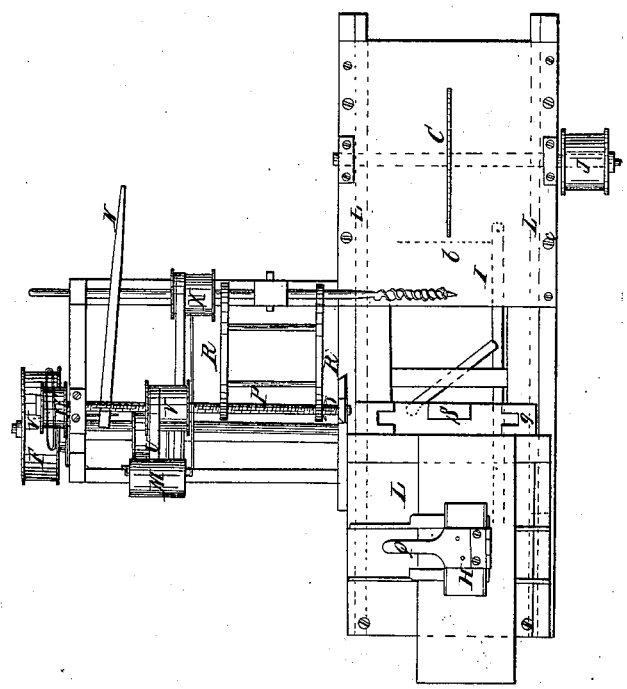

UNITED STATES PATENT OFFICE.

JOHN YOUNG OF C., OF MIDDLETOWN, MARYLAND.

MACHINE FOR BORING POSTS AND POINTING RAILS.

Specification of Letters Patent No. 13,243, dated July 10, 1855.

*To all whom it may concern:*

Be it known that I, JOHN YOUNG OF C., of Middletown, Frederick county, and State of Maryland, have invented a new and Improved Machine for Boring of Posts and Pointing of Rails; and I do hereby declare that the following is a full, clear, and exact description of the same, reference being had to the accompanying model and drawing, which will more fully and at large appear.

The nature of my invention consists in the employing of a series of machinery for the purpose of boring and at the same time, your power is kept in continued motion without retarding or stopping, and to point rails all of one size, when desired by a very slight alteration or change in your machinery.

To enable others skilled in the arts, to make and use my invention, I will now proceed to describe its construction and operation.

A is a side elevation of the machine in general; B is an end view; reference being had to the letters and figures of the drawings which will more accurately describe its operation.

Figures 1, 1, 1, 1, represent the substantial made frame, in which the machinery is placed; F is a large pulley to get up speed to drive the auger, and, the various parts connected thereto, placed on a horizontal shaft, on which are 3 other pulleys E T U; E is intended to drive W on the shaft P by a cross belt, when at labor boring posts, and when the auger is to be withdrawn, draw the lever N which will shift the belt of W in to the loose pulley V and at the same time draw the tightening pulley M on belt on the pulleys T, G, which will enable you to withdraw the auger and chips, without stopping the machine. On the shaft P there is a spiral screw cut therein, and two arms R R serve as bearings or guides for the auger to work in; on the outside of R, R are two pins 8, 8, which serve to conduct auger on to operate and assist in withdrawing when the hole is bored. When you desire to bore posts withdraw the 4 screws C C C C and the saw table can be removed and is ready for operation as above specified.

Preparatory to pointing knock out the key under the machine, which is hid from view, and withdraw the screw $a$ and the boring part can be withdrawn; then return the table O with the saw in to its place, and tighten the 4 screws C C C C and you are ready to point rails; place your driving belt on pulley J and the middle of the rail in the clamp H; draw down the dog Q with the teeth in, on the rail and it will be firmly held; draw out the carriage L, run the rail and carriage to the saw C and it will cut the straight side of rail; return your carriage, push the table with the clamp and rail from you over against the pin marked 5; then run it up to the saw, and at the same time place your foot on the spring I which throws up the gage on the table, marked $b$, which gages the end of the rail, observing as soon as the saw enters the rail to release the spring I, at the same time finishing the point of the rail; reverse the rail by turning the clamp H on the pivot 7 and the opposite end can be operated in a similar manner.

I do not claim any of the separate devices, set forth; but

I do claim—

The reversible clamp, and feed carriage, in combination with the boring apparatus, substantially as set forth and described, for the purposes mentioned.

JOHN YOUNG OF C.

Witnesses:
 JACOB I. C. MILLER,
 REZIN H. MAGRUDER.